US009336388B2

(12) United States Patent
Brdiczka et al.

(10) Patent No.: US 9,336,388 B2
(45) Date of Patent: May 10, 2016

(54) METHOD AND SYSTEM FOR THWARTING INSIDER ATTACKS THROUGH INFORMATIONAL NETWORK ANALYSIS

(71) Applicant: Palo Alto Research Center Incorporated, Palo Alto, CA (US)

(72) Inventors: Oliver Brdiczka, Mountain View, CA (US); Priya Mahadevan, Sunnyvale, CA (US); Runting Shi, San Jose, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 0 days.

(21) Appl. No.: 13/709,940

(22) Filed: Dec. 10, 2012

(65) Prior Publication Data

US 2014/0165195 A1    Jun. 12, 2014

(51) Int. Cl.
*G06F 11/00* (2006.01)
*G06F 21/55* (2013.01)
*G06F 12/14* (2006.01)

(52) U.S. Cl.
CPC .................................. *G06F 21/552* (2013.01)

(58) Field of Classification Search
CPC ............ G06F 21/577; H04L 2463/141; H04L 63/1433
USPC .......................................................... 726/23
See application file for complete search history.

(56) References Cited

U.S. PATENT DOCUMENTS

| | | | |
|---|---|---|---|
| 2005/0138413 A1* | 6/2005 | Lippmann et al. ............ 713/201 |
| 2005/0203881 A1* | 9/2005 | Sakamoto et al. ................ 707/3 |
| 2007/0209075 A1* | 9/2007 | Coffman ......................... 726/23 |
| 2007/0226248 A1* | 9/2007 | Darr ............................... 707/102 |
| 2007/0226796 A1* | 9/2007 | Gilbert et al. .................... 726/22 |
| 2010/0082513 A1* | 4/2010 | Liu ................................ 706/46 |
| 2010/0114630 A1* | 5/2010 | Adler ..................... G06Q 10/06 705/7.36 |
| 2010/0186088 A1* | 7/2010 | Banerjee et al. ............... 726/23 |
| 2010/0235879 A1* | 9/2010 | Burnside et al. .................. 726/1 |
| 2010/0299292 A1* | 11/2010 | Collazo .......................... 706/14 |
| 2010/0313264 A1* | 12/2010 | Xie et al. ........................ 726/22 |
| 2011/0142217 A1* | 6/2011 | Goldfarb ...................... 379/126 |
| 2011/0161108 A1* | 6/2011 | Miller et al. ..................... 705/3 |
| 2011/0246483 A1* | 10/2011 | Darr et al. ..................... 707/748 |
| 2011/0252032 A1* | 10/2011 | Fitzgerald et al. ............ 707/737 |
| 2011/0321020 A1* | 12/2011 | McCabe et al. ............... 717/144 |
| 2012/0096551 A1* | 4/2012 | Lee et al. ....................... 726/23 |

(Continued)

OTHER PUBLICATIONS

D.M. Blei et al., "Latent Dirichlet Allocation", Journal of Machine Learning Research 3, 2003, pp. 993-1022.

(Continued)

*Primary Examiner* — Ashok Patel
*Assistant Examiner* — Gary Gracia
(74) *Attorney, Agent, or Firm* — Shun Yao; Park, Vaughan, Fleming & Dowler LLP (57) ABSTRACT

One embodiment of the present invention provides a system for detecting insider attacks in an organization. During operation, the system collects data describing user activities. The system extracts information from the data that includes user information and user communications. The system then generates a topic-specific graph based on the extracted information. The system analyzes a structure of the graph to determine if one or more rules have been violated. The system may determine that a rule associated with the graph has been violated and signal an alarm in response to detecting the rule violation.

22 Claims, 6 Drawing Sheets

(56) References Cited

U.S. PATENT DOCUMENTS

| | | | |
|---|---|---|---|
| 2012/0130724 A1* | 5/2012 | Flegel et al. | 705/1.1 |
| 2012/0225722 A1* | 9/2012 | Holder et al. | 463/42 |
| 2012/0278021 A1* | 11/2012 | Lin et al. | 702/85 |
| 2013/0268591 A1* | 10/2013 | Chen et al. | 709/204 |
| 2014/0046982 A1* | 2/2014 | Chan | G08F 17/30958 707/798 |
| 2014/0090056 A1* | 3/2014 | Manadhata | G06F 21/552 726/23 |
| 2014/0101134 A1* | 4/2014 | Bohrer | G06Q 30/02 707/722 |

OTHER PUBLICATIONS

Mark Dredze et al., "Generating Summary Keywords for Emails Using Topics", IUI, 2008, pp. 199-206.

Brian Lim et al., "Show Me a Good Time: Using Content to Provide Activity Awareness to Collaborators with ActivitySpotter", 16th ACM International, Group '10, 2010, pp. 263-272.

A. Narayanan et al., "Link Prediction by De-Anonymization: How we won the Kaggle Social Network Challenge", Cornell University Library, http://arxiv.org/abs/1102.4374, 2011, 11 Pages.

Hans-Peter Kriegel et al., "Outlier Detection Techniques", 13th Pacific-Asia Conference on Knowledge Discovery and Data Mining, Munich, Germany, Apr. 2009, www.dbs.ifi.lmu.de.

Yizhou Sun et al., "RankClus: Integrating Clustering with Ranking for Heterogeneous Information Network Analysis", http://www-std.se.cuhk.edu.ik/~hcheng/paper/edbt09_ysun.pdf, EDBT 2009, Saint Petersburg, Russia.

Victoria J. Hodge et al., "A Survey of Outlier Detection Methodologies", Artificial Intelligence Review, 2004, 22 (2) pp. 85-126.

* cited by examiner

METHOD AND SYSTEM FOR THWARTING INSIDER ATTACKS THROUGH INFORMATIONAL NETWORK ANALYSIS

BACKGROUND

1. Field

This disclosure is generally related to organizational security. More specifically, this disclosure is related to a method and system for detecting malicious acts of insiders in an organization.

2. Related Art

There is a longstanding problem of threats from insiders within government and large organizations where respected employees become malicious. Malicious insiders are people with access to confidential information that give away such information and cause irreparable damage. Often, these acts are not committed by a single person, but by a group of colluding insiders. These groups may contain actively malicious insiders as well as ignorant individuals that serve as support. Identifying these individuals is a critical yet challenging task.

Currently, most organizations rely on practices such as background checks, access control lists, user policies and audits to thwart insider attacks. Many current practices also rely heavily on human analysts to do the background checks and to identify connections between people. Unfortunately, such practices are inefficient, labor-intensive, and may be unreliable.

SUMMARY

One embodiment of the present invention provides a system for detecting insider attacks in an organization. During operation, the system collects data describing user activities. The system extracts information from the data that includes user information and user communications. Then, the system generates a topic-specific graph based on the extracted information. The system analyzes a structure of the graph to determine if one or more rules have been violated. The system may determine that a rule associated with the graph has been violated, and signal an alarm in response to detecting the rule violation.

In a variation on this embodiment, the system further detects an anomalous pattern based on the topic-specific graph, and signals the alarm in response to detecting the anomalous pattern.

In a further variation, detecting an anomalous pattern further includes training a model to detect normal patterns; and using the model to detect the anomalous pattern.

In a further variation, the system may detect an anomalous topic based on the topic-specific graph, and signal the alarm in response to detecting the anomalous topic.

In a variation on this embodiment, the system may detect a reference to an anomalous online resource based on the topic-specific graph, and signal the alarm in response to detecting the anomalous online resource.

In a variation on this embodiment, the user activities include user access of documents and/or user access of documents indirectly through actions of another user.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention solve the problem of detecting malicious insider activity by detecting rule violations and anomalous behavioral pattern, communication topics, and website references.

An insider attack detection system combines natural language processing, graph structural analysis, and anomaly detection techniques to predict and/or detect insider attacks. An insider attack is a malicious act performed by a person (or group of people) authorized to access confidential information or resources. The system can distinguish between unusual behavior that is harmless and unusual behavior indicating malicious intent. The system collects communication and document access (and/or other) data and combines user behavior analysis, natural language processing, and topic detection to generate an activity graph and topic graphs. The activity graph corresponds to an information network. An information network is a network composed of objects and users, with users accessing objects and users communicating with other users. In the activity graph, nodes represent users and objects, and edges represent user-to-user communication or user-to-object access patterns. An object is any document or other accessible resource. A topic graph is a subset of an activity graph that represents only activity and/or communications relating to a specific topic.

The system facilitates building and training models that detect normal and specific behavioral patterns in the graphs. For example, the system can learn a person's access patterns for various objects by analyzing the structure of the activity graph. The system can also learn communication patterns between people by analyzing a structure of a communication graph and/or other activity graph. Topic information can be included in the graphs. A communication graph is an activity graph in which all the graph edges represent user-to-user communications.

With these models and graphs, the system can detect anomalies in data access and/or communication patterns that can indicate malicious intent. An anomaly or outlier is a pattern that is different from the normal behavior. The system can also store and use rules to detect malicious behavior. The system can detect a rule violation or an anomaly in object access and/or communication patterns. The system signals an alarm in response to detecting such rule violations and/or anomalies.

Specifically, in one embodiment, the system can gather host-based user profiling data (e.g., logging all commands used by a user), network profiling data (e.g., a user's access patterns), data from websites (whether internal or external to an organization), social networking sites, and other sources of information to generate both a user communication graph and a document access graph. The system can add topical information to the graphs and analyze graph structures to determine whether one or more rules have been violated in order to detect an insider attack.

Monitoring an Organization to Detect Insider Attacks

Figure 1A:
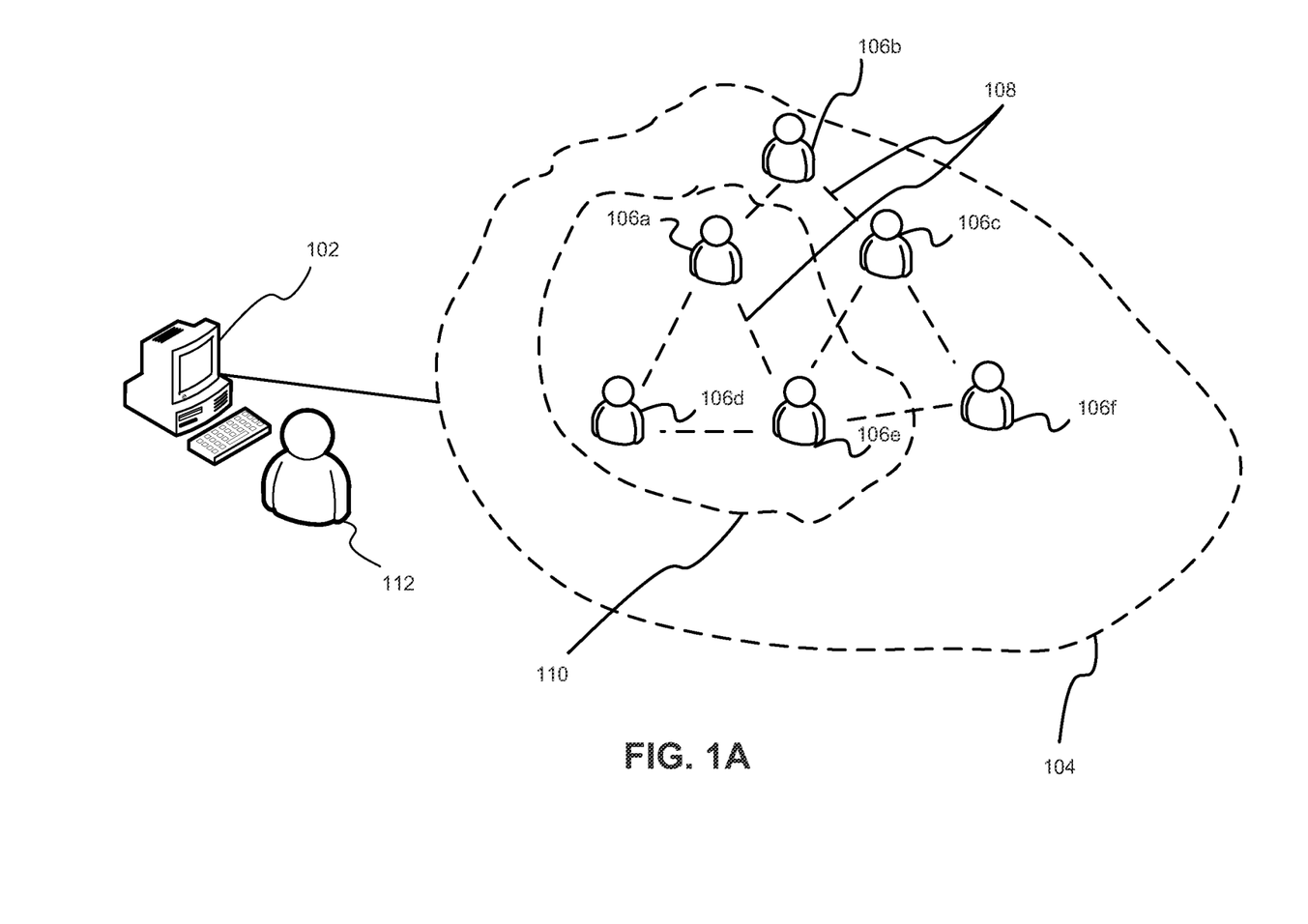
FIG. 1A presents a diagram illustrating an overview of monitoring an organization for insider attacks, in accordance with an embodiment of the present invention.

FIG. 1A presents a diagram illustrating an overview of monitoring an organization for insider attacks, in accordance with an embodiment of the present invention. In FIG. 1A, an insider attack detection system 102 analyzes communication data and/or other activity data within an organization 104. The organization may include a large number of employees and related personnel 106a, 106b, 106c, 106d, 106e, and 106f.

The employees and personnel communicate (e.g., represented by dashed lines 108) with each other. Their communications and/or other activities tend to follow certain patterns. For example, a secretary usually communicates with an executive about meetings and clients. The employees may also visit online resources (e.g., websites) and access objects. For example, employees may access resources such as an internal human resource website and database, or engineering documents from a repository. One group of employees 110 may act maliciously. System 102 can detect the malicious activities and notify a security administrator 112.

System 102 employs two techniques to detect malicious activities. First, system 102 can analyze employee communications and other activities to detect rule violations. System 102 generates a graph representing communications between employees and analyzes the graph to detect rule violations. The administrator and/or system 102 define the rules to detect malicious activities. System 102 raises an alarm and notifies security administrator 112 when rule violations are detected.

Second, system 102 can also analyze communication patterns, topics, and references to online resources (e.g., websites). System 102 can analyze the structure of an activity graph and/or a topic graph to separate the typical structures in the activity graph from the anomalous ones. System 102 raises an alarm upon detecting anomalies such as unknown communication patterns, topics, or websites. Note that system 102 can be a cluster of computers that analyzes user activities and performs data mining to detect malicious activities. The cluster of computers can be both centralized and distributed across the world.

Figure 1B:
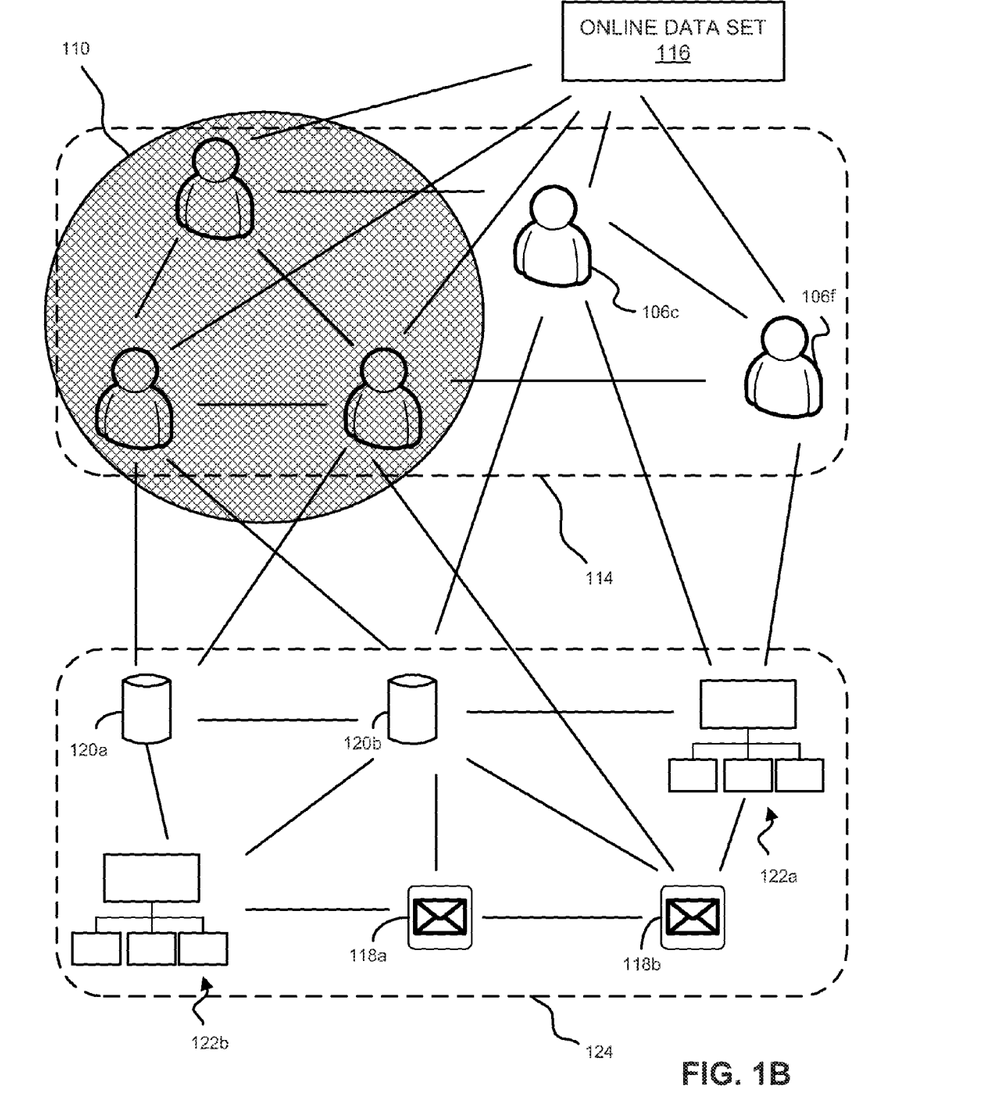
FIG. 1B presents a diagram illustrating exemplary monitored interactions within an organization, in accordance with an embodiment of the present invention.

FIG. 1B presents a diagram illustrating exemplary monitored interactions within an organization, in accordance with an embodiment of the present invention. System 102 can analyze the example communications and activities illustrated in FIG. 1B, in order to detect malicious acts.

In FIG. 1B, the malicious group of users 110 form part of a social network 114 within the organization. The malicious users also communicate and interact with non-malicious users 106c, 106f in the organization. The users access digital artifacts in their regular duties and/or in performing malicious acts. Digital artifacts are objects such as electronic documents and/or other information resources. The users also access an online data set 116, which includes social networks, blogs, etc. The digital artifacts includes e-mail 118a, 118b, documents from data repositories 120a, 120b, and other internal organizational information 122a, 122b in a digital artifact network 124. Users can access documents either directly or indirectly (e.g., accessing documents indirectly through actions of another user). For example, user A can access document D, and subsequently e-mail the document to user B.

System 102 may detect malicious users 110 accessing objects or communicating in a suspicious manner and signal an alarm. The malicious users may be, for example, illegally distributing the digital artifacts. Using the techniques disclosed herein, system 102 can analyze their communications and behavioral patterns (e.g., object access patterns) to detect these insider attacks.

Detecting Insider Attacks

Figure 2:
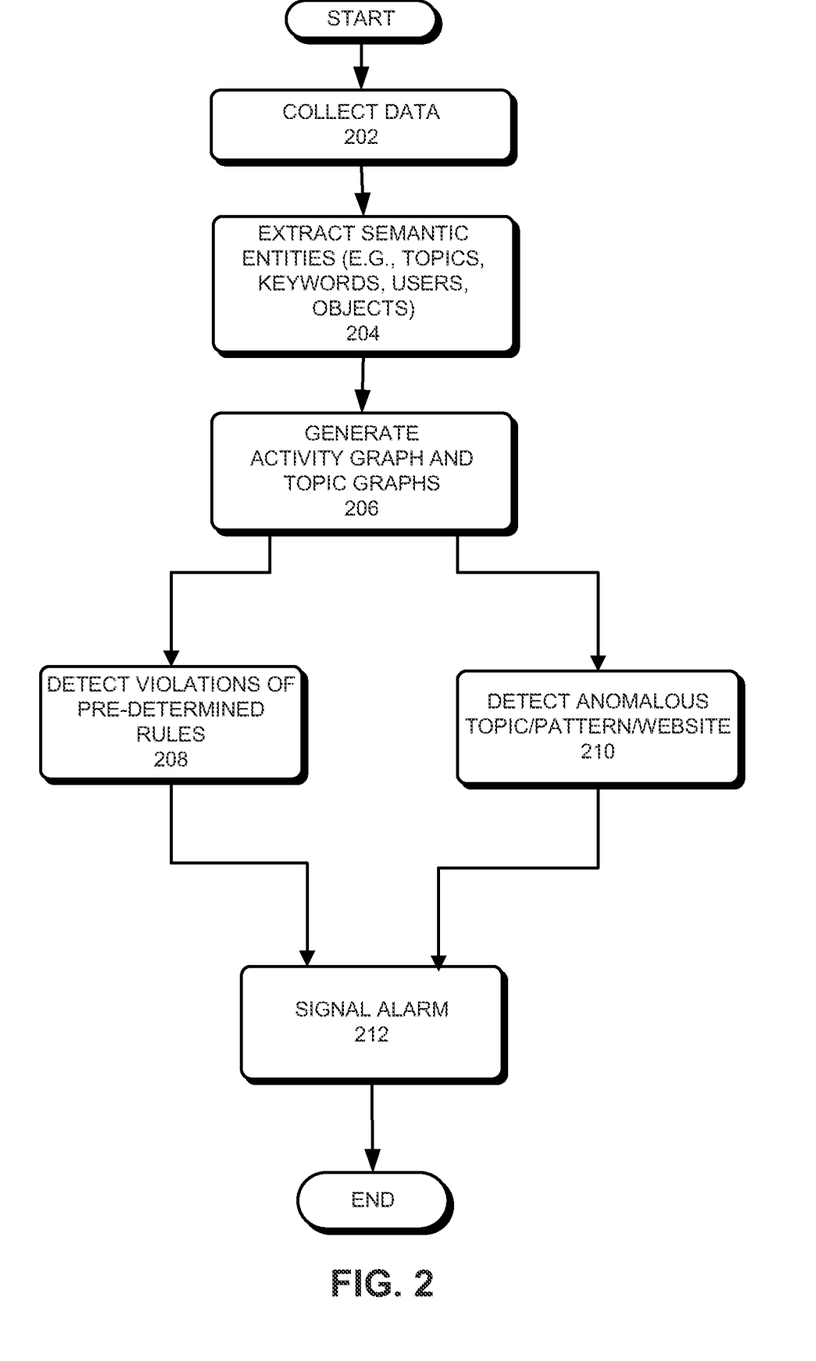
FIG. 2 presents a flowchart illustrating an exemplary process for detecting insider attacks, in accordance with an embodiment of the present invention.

FIG. 2 presents a flowchart illustrating an exemplary process for detecting insider attacks, in accordance with an embodiment of the present invention. During operation, system 102 collects data from sources such as online communities (e.g., Facebook®) and an organization's network (operation 202). The collected data includes organizational data, content, and metadata from all activities, including social network communications. Note that the data may include user communication and object access data. System 102 extracts semantic entities from the data, including person names, companies, specific actions, topics, and keywords (operation 204). System 102 can use natural language processing techniques to determine topics and sensitivity levels of objects and communications. For example, system 102 can estimate topics of objects and/or communications using Latent Dirichlet Allocation (LDA). LDA is a topic model for text or other discrete data. LDA allows for analyzing a large body of documents to extract the topics in the document. The data collected can also be used for defining/refining rules.

Using topic and sensitivity analysis, system 102 may differentiate suspected malicious behavior from unusual, but acceptable behavior. For example, if two employees in different departments that normally do not communicate with each other suddenly start exchanging e-mails, such behavior is unusual. However, whether such behavior shows malicious intent depends on the nature of the conversation. If two users meet during a baseball game, and they are exchanging e-mails about a baseball practice, then this is likely unusual but benign behavior. However, if these two users are exchanging sensitive information or documents not meant to be shared outside one's own department, this potentially suggests malicious behavior.

System 102 generates an activity graph and/or topic graphs using the extracted semantic information (operation 206). In particular, system 102 can generate the graphs using extracted user, object, user-to-user communications, and/or user-to-object access data. In some embodiments, system 102 generates a communication graph reflecting communications between personnel related to the organization.

System 102 can detect violations of pre-determined rules that are stored in rule base 212 (operation 208). System 102 can analyze the structure of the generated graphs to detect violations. In some embodiments, the system allows for building and training models to detect rule violations. If system 102 detects a rule violation, system 102 signals an alarm (operation 212). For example, a person in the organization normally communicates a key phrase with specific members of the organization. If the person suddenly communicates with others regarding this key phrase in violation of a rule, system 102 signals the alarm.

System 102 also detects anomalous topics, patterns, and/or websites (operation 210). System 102 facilitates building and training models to determine normal patterns and/or topics, and using the models to distinguish anomalous patterns and/or topics. Since most behavioral and communication patterns are normal, anomalous patterns can indicate suspicious activity. For example, system 102 may determine the normal behavior of all secretaries. If a secretary suddenly begins to talk to people from different departments, then the secretary's pattern is an outlier pattern. The secretary may also perform other outlier activities such as visiting previously unknown websites. Also, the secretary may suddenly discuss topics not previously associated with normal secretary communications, such as techniques to get around security protocols. The secretary may also perform an activity that is not considered unusual for regular work hours, but may trigger an alarm if performed during late evenings. System 102 detects these anomalous patterns and signals an alarm.

System 102 can combine semantic information and graph structure to enable fine-grained behavioral analysis and link prediction. For example, it may be normal for two users in different departments to exchange e-mails about company-wide affairs. However, if the two users start communicating about a highly sensitive project belonging to one department, this may indicate an anomaly.

System 102 may use link prediction to differentiate normal behavior from unusual behavior in the activity graph. Such link prediction leverages the structural information of the activity graph. System 102 can predict links using a supervised learning algorithm to train a model for a graph (with some edges hidden). Then, system 102 can compute a probability that an edge exists (or will appear) between two users. A high edge probability suggests that two users are likely to communicate with each other, or that a user is likely to access a certain object. However, if system 102 computes a low edge probability, system 102 marks the corresponding communication or data access as suspicious.

System 102 can also leverage community identification techniques to analyze the community structure of the information network. In particular, system 102 can determine management or organizational hierarchies and communities of users or objects that are close to each other. Such communities include, for example, users with similar interests or users working on similar topics, or objects or documents with similar subjects. Identifying the communities may facilitate the detection of malicious activity by groups.

In response to detecting unknown or anomalous topics, patterns, and/or websites, system 102 signals an alarm (operation 212). The security administrator can then investigate the anomaly to determine the seriousness of the potential threat.

Detection System Components

Figure 3:
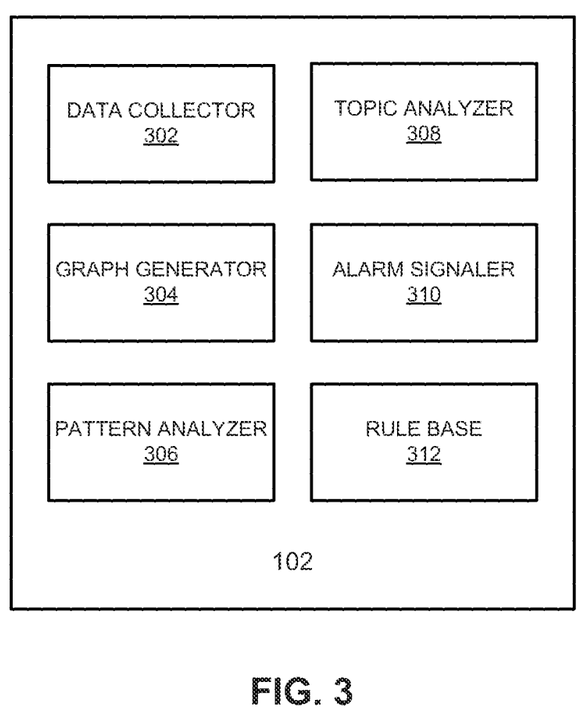
FIG. 3 presents a diagram illustrating components of an exemplary system for detecting insider attacks, in accordance with an embodiment of the present invention.

FIG. 3 presents a diagram illustrating components of an exemplary system 102 for detecting insider attacks, in accordance with an embodiment of the present invention. System 102 includes a data collector 302, a graph generator 304, a pattern analyzer 306, a topic analyzer 308, an alarm signaler 310, and a rule base 312.

Data collector 302 collects communication and system-level data such as system logs and access controls. Data collector 302 can collect large data traces from an organization. The collected data includes content and metadata associated with all activities occurring at a user's workstation. Data collector 302 can also collect data relating to use of any online forum (e.g., chat rooms, web forums), whether associated with an employee's organization or not. Data collector 302 can collect data relating to social networks (e.g., Facebook® and Twitter®) by monitoring social network communications. Further, data collector 302 can annotate certain activities in the data set with dedicated activity labels to train models. For example, data collector 302 can label activities such as a group of people working on a proposal or planning a malicious act.

Graph generator 304 generates an activity graph and/or topic/keyword graphs. Graph generator 304 can generate graphs using information that includes user communication patterns, object/document access patterns and social network connections. Graph generator 304 can also extract semantic entities (e.g., person names, companies, specific actions, and keywords) and behavioral patterns from data using natural language processing with topic and activity detection. Graph generator 304 can annotate connections in the activity graph with the resulting semantic information. For example, if person A and person B access document X, graph generator 304 links person A and person B to document X with an "access" decorator in the activity graph. If person B sends document X to person C, graph generator 304 connects person B to person C with a "share" decorator in the activity graph.

The system can augment the activity graph with attributes such as time of the data access or conversation, and topic of the object or conversation. Note that the system may determine the topic using natural language processing techniques. The system can also augment the activity graph with data from publicly available data sets, including data from large scale social and/or communication networks (e.g., Facebook®).

A pattern analyzer 306 analyzes the activity graph to create models representing normal behavioral patterns. The pattern analyzer 306 learns patterns of access between individuals and objects and communication patterns between users. The collected data typically contains repetitive patterns such as daily e-mail communications between a manager and employees, and webpage visits between friends in a social network. Pattern analyzer 306 identifies and generalizes these common patterns to determine normal behavioral patterns, thus facilitating the detection of anomalies.

Topic analyzer 308 determines the underlying topic of a document or communication. Topic analyzer 308 can determine topics and sensitivity levels of document objects and user communications using natural language processing. In an embodiment, topic analyzer 308 may estimate the underlying topics of documents or communications using the LDA clustering technique. Topic analyzer 308 can use LDA to estimate the topics from a term list with occurrence frequencies. Further, topic analyzer 308 can use LDA to model e-mail content about activities and generate e-mail summary keywords. Topic analyzer 308 can also use LDA to model users' work or communication patterns in terms of higher level topics, allowing system 102 to associate communication traces, documents, people and their behavior with the same topics.

Rule base 312 stores rules for detecting abnormal activity, and alarm signaler 310 notifies the security administrator 112 of possible malicious activity.

Note that although FIG. 3 illustrates components with specific functionality for detecting insider attacks, different embodiments may also assign the functionality to the components in different ways. Embodiments of the present invention are not limited to any particular assignment of functionality to the various components.

Detection Graphs

Figure 4:
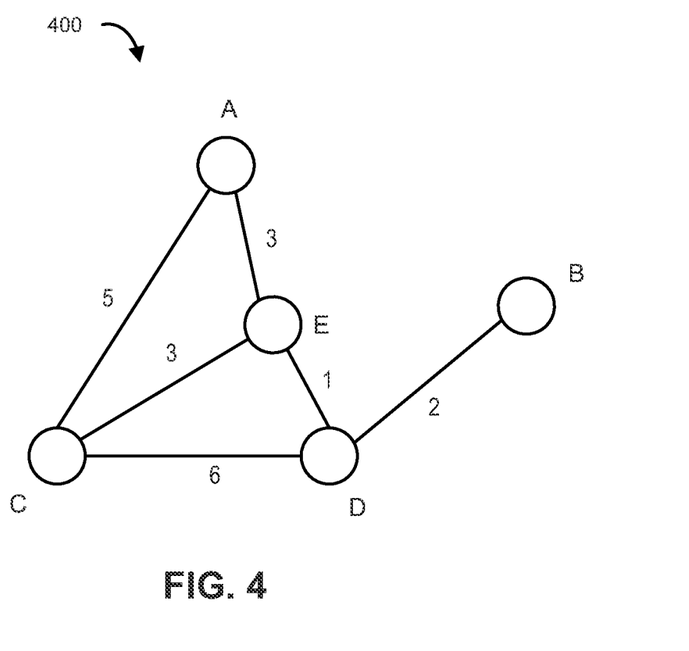
FIG. 4 presents a diagram illustrating an exemplary communication graph, in accordance with an embodiment of the present invention.
Figure 5:
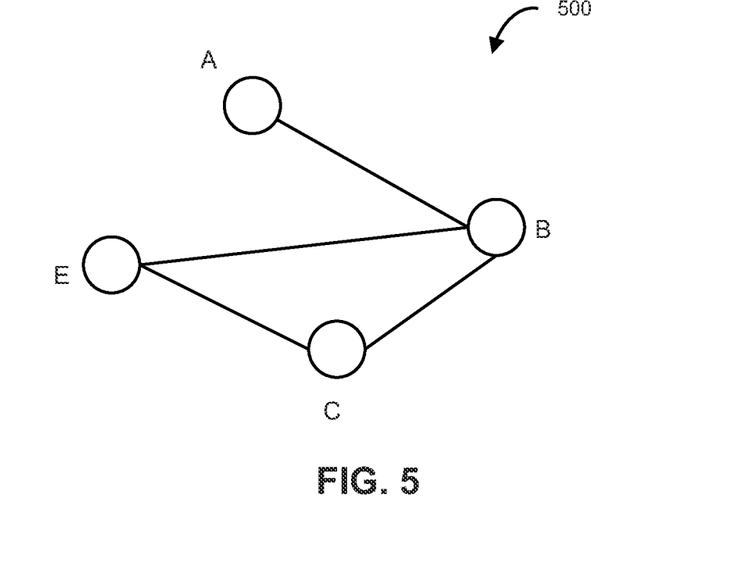
FIG. 5 presents a diagram illustrating an exemplary specific topic/keyword graph, in accordance with an embodiment of the present invention.

FIG. 4 presents a diagram illustrating an exemplary communication graph 400, in accordance with an embodiment of the present invention. FIG. 4 and FIG. 5 illustrate details of a communication graph and a related topic graph. In these graphs, nodes represent users (e.g., people with access to confidential information) and edges represent user-to-user communications. The nodes and edges can be annotated with relevant information. Further, one can also assign weights to the edges that, for example, quantify how frequently two users communicate with each other, or how frequently a user uses a particular topic while performing an activity like composing e-mail. The system may trigger an alarm if the weights assigned to the edges exceed or fall below a certain predetermined threshold. The system can also analyze the structures of the generated graphs to detect malicious activity. Note that graphs may also be generated for object access alone or a mix of object access and/or user communication.

FIG. 4 illustrates communications between personnel in an organization. Nodes A, B, C, D, and E represent employees and/or related personnel of the organization. System 102 analyzes organizational and online community data to generate communication graph 400. System 102 can annotate the nodes to represent employees A, B, C, D, and E, and annotate the edges with communication frequency information. For example, node A communicates with node C five times during a pre-determined time interval. Similarly, node A communicates with node E three times, node E communicates with node D once, node E communicates with node C three times, node D communicates with node C six times, and node B communicates with node D two times. If a pre-determined threshold is five communication sessions between two users, system 102 can raise an alarm for communication between node C and node D, and for communication between node A and node C. System 102 can analyze communication graph 400 to detect malicious acts. Such analysis can include detecting rule violations and detecting outlier patterns, topics, and/or websites.

FIG. 5 presents a diagram illustrating an exemplary specific topic/keyword graph 500, in accordance with an embodiment of the present invention. In FIG. 5, nodes A, B, C, and E each represent a person. Node A is discussing a specific topic with node B, and nodes B, C and E are discussing the topic with each other. For example, node A may be discussing trade secrets with node B.

System 102 can generate topic-specific graphs and/or keyword-specific graphs based on the communication graph 400 and/or collected data. System 102 can generate topic-specific graphs for topics such as gun, bomb, WikiLeaks, a download website link, or an upload website link. Note that the topics can also be higher level abstract subjects, such as compensation, work benefits, and unhappiness. Edge weights can be assigned based on how relevant an edge weight is to a certain topic or how frequently a particular topic is being mentioned in the communication. Then, system 102 analyzes characteristics of the generated topic graphs and signals an alarm if system 102 detects possibly malicious anomalous conditions. A security administrator can examine such topics and/or the topic graph to determine motivations for user or group behavior.

Note that the graph of FIG. 5 is a subgraph of a communication graph. The following examples illustrate using the graphs of FIG. 4 and FIG. 5 to detect insider attacks and/or other malicious activity.

Detecting Rule-Based Violations

System 102 can use a rule-based technique to detect anomalies that may indicate malicious activity. System 102 expresses the rules in terms of features (e.g., structural characteristics) of a graph. For example, rule base 212 may store a rule that a Chief Financial Officer (CFO) (e.g., node E in FIG. 4) should only communicate revenue data with other executive officers and accounting staff (e.g., nodes A and D in FIG. 4). If revenue data is present in some communication from the CFO to an unauthorized recipient (e.g., node C in FIG. 4), then system 102 signals the alarm.

As another example, system 102 may signal the alarm if an employee (e.g., node B in FIG. 4) with access to highly confidential data violates a rule by visiting WikiLeaks. Another rule may be if a person (e.g., node E in FIG. 4) communicates with at least three other people (e.g., nodes A, C and D in FIG. 4) about a particular topic (e.g., trade secrets), then system 102 signals the alarm. In another example, a rule is that a person (e.g., node E in FIG. 5) can only communicate a key phrase (e.g., "nuclear code") with two other specific people (e.g., node A and node B in FIG. 5). Node E uses the key phrase in a communication with node C (as shown in FIG. 5), which is a violation of the rule. System 102 then signals an alarm. System 102 may also signal the alarm upon detecting specific terminology that violates a rule. For example, system 102 may detect the word "upload" in a specific topic graph (e.g., FIG. 5) relating to WikiLeaks. System 102 then signals the alarm.

System 102 can analyze structural characteristics of the graph to determine compliance with rules. System 102 can analyze the centrality of nodes in the graph (e.g. degree centrality, betweenness, closeness, and/or eigenvector centrality) to determine rule violations. Node centrality reflects the relative importance of a node within the graph. Degree centrality is the number of links incident upon a node. Closeness centrality is the inverse of farness, which is defined as the sum of distances to all other nodes. Nodes that have a high probability to occur on a randomly chosen shortest path between two randomly chosen nodes have a high betweenness. Eigenvector centrality assigns relative scores to nodes in the graph such that connections to high-scoring nodes contribute more to the score of the node than equal connections to low-scoring nodes. System 102 may also analyze the clustering coefficient of a node. The clustering coefficient measures how interconnected the node's neighbors are.

System 102 can use any of these measures of degree centrality, clustering coefficient, or other features of the graph to determine compliance with rules. For example, when certain properties of the graph exceed a threshold value, system 102 can signal an alarm. System 102 can analyze the number of nodes connected to a node (e.g., degree centrality) to determine the number of people discussing a topic with one person. In one example, if a person (e.g., node E in FIG. 5) discusses a topic (e.g., budget or revenue projection) with more than three people, then system 102 raises the alarm. In such a case, more than three edges will be connected to node E. Since node E is connected to only node B and node C in FIG. 5, then node E's communications do not raise an alarm.

Detecting Outlier Patterns, Topics, and Websites

System 102 can detect potentially damaging situations without rules by detecting anomalies in patterns, topics, and/or websites. System 102 can determine anomalies using topic graphs and/or activity graphs. System 102 can detect typical patterns of communications for specific topics, and signal an alarm if the pattern is anomalous. For example, nodes E, B and C (FIG. 5) typically appear in a topic graph discussing marketing strategy. However, system 102 suddenly detects, in various topic graphs, communication patterns among nodes E, B and C indicating that E is unhappy with compensation, rude with coworkers, and visits strange websites. This is an outlier pattern and system 102 raises the alarm.

Using a topic and/or activity graph, system 102 can identify a group capable of malicious intent, based on communication patterns among the group. For example, system 102 can detect the anomalous discussion of keyword codes to launch a malicious plan among the group, and signal the alarm. System 102 may also detect unknown terminology and signal an alarm. For example, despite that there are no rules regarding WikiLeaks, the system can detect an anomalous topic (e.g., WikiLeaks) being discussed among employees and raise an alarm.

System 102 can learn the typical patterns of a role in an organization and detect an outlier pattern. For example, secretaries usually only communicate with people that work closely with the secretary in the same department. System 102 learns the secretary communication patterns based on an average of all secretary communications. If a secretary's communications are typical, then system 102 does not raise an alarm. If one secretary (e.g., node E in FIG. 5) suddenly communicates with people in external departments or organizations, then this communication pattern is anomalous and may indicate malicious activity. System 102 signals an alarm upon detecting the outlier pattern.

Note that the system can detect an anomaly and raise an alarm based on a predetermined threshold. For example, the system signals an alarm if at least five nodes are interconnected in a topic graph. Further, the system can associate different levels of confidence with alarms. Such confidence levels may depend on the degree of outlierness or other factors.

Exemplary Computer System for Detecting Insider Attacks

Figure 6:
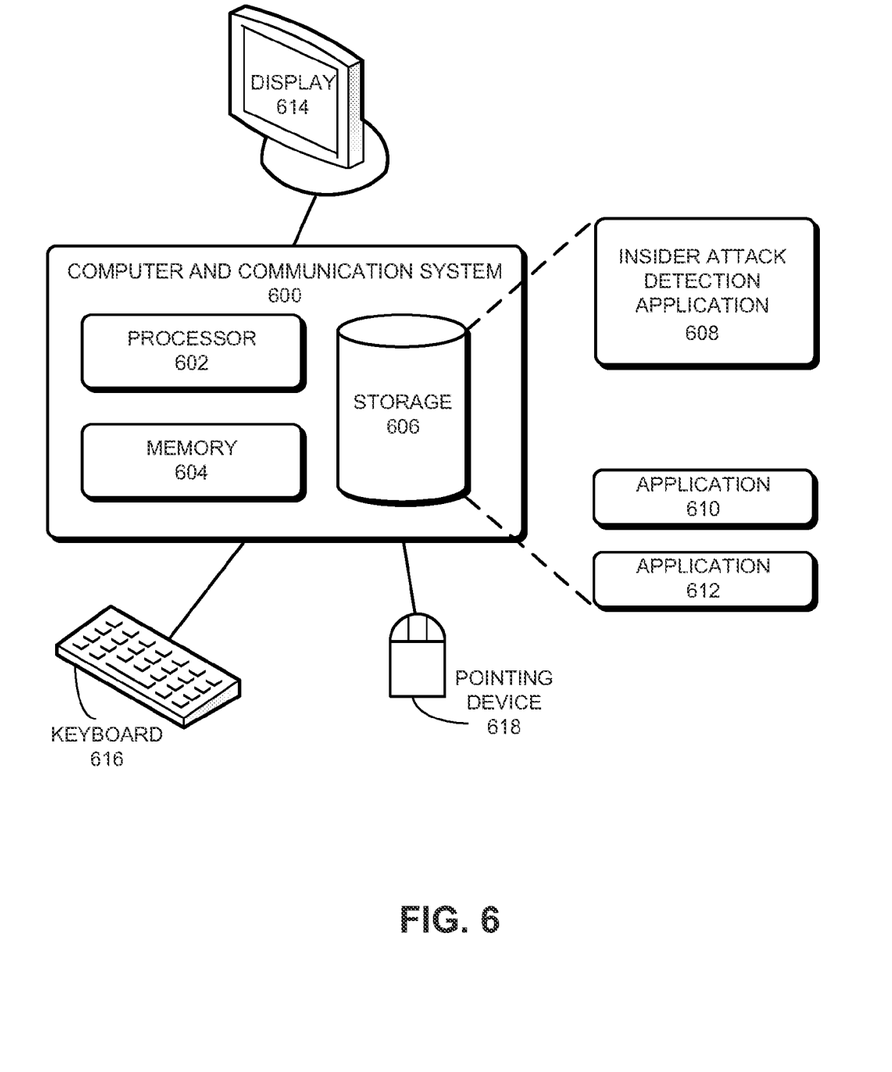
FIG. 6 illustrates an exemplary computer system for detecting insider attacks, in accordance with one embodiment of the present invention.

FIG. 6 presents a diagram illustrating an exemplary computer system for detecting insider attacks, in accordance with one embodiment of the present invention. In one embodiment, a computer and communication system 600 includes a processor 602, a memory 604, and a storage device 606. System 600 is an example implementation of insider attack detection system 102. Storage device 606 stores an insider attack detection application 608, as well as other applications, such as applications 610 and 612. During operation, insider attack detection application 608 is loaded from storage device 606 into memory 604 and then executed by processor 602. While executing the program, processor 602 performs the aforementioned functions. Computer and communication system 600 is coupled to an optional display 614, keyboard 616, and pointing device 618.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-executable method for detecting insider attacks in an organization, the method comprising:
   extracting topic information from data that describes user activities of a plurality of users, wherein a respective user is associated with a respective role of the organization;
   analyzing communications between a plurality of users associated with computing devices within a network, the plurality of users being associated with a particular role within the organization, to determine topics mentioned in typical communications for the particular role;
   selecting a topic mentioned in the typical communications of the particular role within the organization;
   generating a topic-specific graph for the selected topic and based on the extracted topic information aggregated from the plurality of users, wherein a respective node of the topic-specific graph represents a user or an object, and wherein a respective edge of the topic-specific graph represents a communication or object-accessing activity associated with the selected topic;
   determining one or more rules for analyzing the topic-specific graph, wherein a respective rule expresses structural characteristics that are not allowed in the topic-specific graph, for the particular role within the organization, with respect to the selected topic;
   analyzing, by a computing device, the structure of the topic-specific graph to determine whether a structural characteristic for a portion of the topic-specific graph violates the structural characteristics of the respective rule;
   determining that a communication or object-accessing activity is anomalous in response to determining that the topic-specific graph violates the respective rule associated with the particular role;
   determining that there is a low probability of an edge appearing in the topic-specific graph between two nodes;
   determining that there exists an edge in the topic-specific graph between the two nodes; and
   marking the edge as a suspicious edge.

2. The method of claim 1, further comprising:
   detecting an anomalous pattern based on the topic-specific graph; and
   signaling an alarm in response to detecting the anomalous pattern.

3. The method of claim 2, wherein detecting an anomalous pattern further comprises training a model to detect normal patterns; and using the model to detect the anomalous pattern.

4. The method of claim 1, further comprising:
   detecting an anomalous topic based on the topic-specific graph; and
   signaling an alarm in response to detecting the anomalous topic.

5. The method of claim 1, further comprising:
   detecting a reference to an anomalous online resource based on the topic-specific graph; and
   signaling an alarm in response to detecting the anomalous online resource.

6. The method of claim 1, wherein the user activities include user access of documents and/or user access of documents indirectly through actions of another user.

7. The method of claim 1, further comprising signaling an alarm in response to determining that the topic-specific graph violates a rule.

8. The method of claim 1, further comprising:
   determining that a plurality of edges in the topic-specific graph represents a user communicating a specific phrase with a plurality of other users in violation of a rule; and
   signaling an alarm in response to the determination.

9. The method of claim 1, further comprising:
   determining that a plurality of edges in the topic-specific graph represents a user communicating unknown terminology with a plurality of other users; and
   signaling an alarm in response to the determination.

10. The method of claim 1, wherein determining that a communication or object-accessing activity is anomalous further comprises:
    determining that a plurality of edges in the topic-specific graph represents a user communicating a prohibited topic with a plurality of other users exceeding a predetermined threshold number of users in violation of a rule; and
    signaling an alarm in response to the determination.

11. A computing system for detecting insider attacks in an organization, the system comprising:
    one or more processors,
    a non-transitory computer-readable medium coupled to the one or more processors having instructions stored thereon that, when executed by the one or more processors, cause the one or more processors to perform operations comprising:
    extracting topic information from data that describes user activities of a plurality of users, wherein a respective user is associated with a respective role of the organization;
    analyzing communications between a plurality of users associated with computing devices within a network, the plurality of users being associated with a particular role within the organization, to determine topics mentioned in typical communications for the particular role;
    selecting a topic mentioned in the typical communications of the particular role within the organization;
    generating a topic-specific graph for the selected topic and based on the extracted topic information aggregated from the plurality of users, wherein a respective node of the topic-specific graph represents a user or an object, and wherein a respective edge of the topic-specific graph represents a communication or object-accessing activity associated with the selected topic;
    determining one or more rules for analyzing the topic-specific graph, wherein a respective rule expresses structural characteristics that are not allowed in the topic-specific graph, for the particular role within the organization, with respect to the selected topic;
    analyzing the structure of the topic-specific graph to determine whether a structural characteristic for a portion of the topic-specific graph violates the structural characteristics of the respective rule; and
    determining that a communication or object-accessing activity is anomalous in response to determining that the topic-specific graph violates the respective rule associated with the particular role;
    determining that there is a low probability of an edge appearing in the topic-specific graph between two nodes;
    determining that there exists an edge in the topic-specific graph between the two nodes; and
    marking the edge as a suspicious edge.

12. The computing system of claim 11, wherein the non-transitory computer-readable storage medium stores additional instructions that, when executed, cause the one or more processors to perform additional steps comprising:
    detecting an anomalous pattern based on the topic-specific graph; and
    signaling an alarm in response to detecting the anomalous pattern.

13. The computing system of claim 12, wherein detecting an anomalous pattern further comprises training a model to detect normal patterns; and using the model to detect the anomalous pattern.

14. The computing system of claim 11, wherein the non-transitory computer-readable storage medium stores additional instructions that, when executed, cause the one or more processors to perform additional steps comprising:
    detecting an anomalous topic based on the topic-specific graph; and
    signaling an alarm in response to detecting the anomalous topic.

15. The computing system of claim 11, wherein the non-transitory computer-readable storage medium stores additional instructions that, when executed, cause the one or more processors to perform additional steps comprising:
    detecting a reference to an anomalous online resource based on the topic-specific graph; and
    signaling an alarm in response to detecting the anomalous online resource.

16. The computing system of claim 11, wherein the user activities include user access of documents and/or user access of documents indirectly through actions of another user.

17. A non-transitory computer-readable storage medium storing instructions that when executed by a computer cause the computer to perform a method for detecting insider attacks in an organization, the method comprising:
    extracting topic information from data that describes user activities of a plurality of users, wherein a respective user is associated with a respective role of the organization;
    analyzing communications between a plurality of users associated with computing devices within a network, the plurality of users being associated with a particular role within the organization, to determine topics mentioned in typical communications for the particular role;
    selecting a topic mentioned in the typical communications of the particular role within the organization;
    generating a topic-specific graph for the selected topic and based on the extracted topic information aggregated from the plurality of users, wherein a respective node of the topic-specific graph represents a user or an object, and wherein a respective edge of the topic-specific graph represents a communication or object-accessing activity associated with the selected topic;

determining one or more rules for analyzing the topic-specific graph, wherein a respective rule expresses structural characteristics that are not allowed in the topic-specific graph, for the particular role within the organization, with respect to the selected topic;

analyzing the structure of the topic-specific graph to determine whether a structural characteristic for a portion of the topic-specific graph violates the structural characteristics of the respective rule;

determining that a communication or object-accessing activity is anomalous in response to determining that the topic-specific graph violates the respective rule associated with the particular role;

determining that there is a low probability of an edge appearing in the topic-specific graph between two nodes;

determining that there exists an edge in the topic-specific graph between the two nodes; and marking the edge as a suspicious edge.

18. The non-transitory computer-readable storage medium of claim 17, wherein the computer-readable storage medium stores additional instructions that, when executed, cause the one or more processors to perform additional steps comprising:

detecting an anomalous pattern based on the topic-specific graph; and signaling an alarm in response to detecting the anomalous pattern.

19. The non-transitory computer-readable storage medium of claim 18, wherein detecting an anomalous pattern further comprises training a model to detect normal patterns; and using the model to detect the anomalous pattern.

20. The non-transitory computer-readable storage medium of claim 17, wherein the computer-readable storage medium stores additional instructions that, when executed, cause the one or more processors to perform additional steps comprising:

detecting an anomalous topic based on the topic-specific graph; and signaling an alarm in response to detecting the anomalous topic.

21. The non-transitory computer-readable storage medium of claim 17, wherein the computer-readable storage medium stores additional instructions that, when executed, cause the one or more processors to perform additional steps comprising:

detecting a reference to an anomalous online resource based on the topic-specific graph; and signaling an alarm in response to detecting the anomalous online resource.

22. The non-transitory computer-readable storage medium of claim 17, wherein the user activities include user access of documents and/or user access of documents indirectly through actions of another user.

* * * * *